United States Patent
Trompiz

(10) Patent No.: US 7,624,972 B2
(45) Date of Patent: Dec. 1, 2009

(54) VALVE CONFIGURATION THAT INCREASES THE CAPACITY AND IMPROVES THE PERFORMANCE OF CROSS-FLOW TRAYS USED IN FRACTIONATION UNITS OF CHEMICAL, PETROCHEMICAL AND OIL REFINING PROCESS PLANTS

(76) Inventor: Carlos Jose Trompiz, 2634 Salt Grass Trail, Deer Park, TX (US) 77536

( * ) Notice: Subject to any disclaimer, the term of this patent is extended or adjusted under 35 U.S.C. 154(b) by 267 days.

(21) Appl. No.: 11/936,650

(22) Filed: Nov. 7, 2007

(65) Prior Publication Data

US 2009/0115079 A1 May 7, 2009

(51) Int. Cl.
*B01F 3/04* (2006.01)

(52) U.S. Cl. ............... 261/114.3; 261/114.4; 261/114.5
(58) Field of Classification Search .............. 261/114.1, 261/114.2, 114.3, 114.4, 114.5
See application file for complete search history.

(56) References Cited

U.S. PATENT DOCUMENTS

| 3,693,948 | A | * | 9/1972 | Kloss .................. 261/114.2 |
| 5,762,834 | A | * | 6/1998 | Hauser et al. ............ 261/114.3 |
| 5,911,922 | A | * | 6/1999 | Hauser et al. ............ 261/114.4 |

* cited by examiner

*Primary Examiner*—Scott Bushey

(57) ABSTRACT

A mass or heat transfer device is provided in the form of a tray with at least one movable or fixed valve covering an opening to prevent liquid flowing in the design flow direction to pass through the opening.

4 Claims, 1 Drawing Sheet

VALVE CONFIGURATION THAT INCREASES THE CAPACITY AND IMPROVES THE PERFORMANCE OF CROSS-FLOW TRAYS USED IN FRACTIONATION UNITS OF CHEMICAL, PETROCHEMICAL AND OIL REFINING PROCESS PLANTS

Valve configuration that increases the capacity and improves the performance of cross-flow trays used in fractionation units of chemical, petrochemical and oil refining process plants.

BACKGROUND OF THE INVENTION

This invention relates to chemical, petrochemical or oil refining process equipment in which liquid is contacted with gas or vapor. This liquid-gas contact may be used for mass transfer where a component from the gas or vapor is absorbed by the liquid or a component from the liquid is stripped by the gas or vapor. It also may be used for heat transfer between the liquid and the gas or vapor.

The invention is specifically related to trays with cross-flow in which the liquid passes from one tray to the tray below through downcomers, while the gas or vapor passes though the trays openings covered by the valves. The trays are arranged horizontally within a tower or column. The gas or vapor goes from the bottom to the top of the column, while the liquid flows on each tray horizontally (creating the "cross-flow" respect to the up-flow of the gas or vapor) from one side of the tray to the other where it enters the tray downcomer to go to the tray below. The horizontal liquid flow across the tray is what is described as the "liquid design flow direction".

The valves that cover the openings on the trays allowing the gas or vapor to pass can be fixed or movable. The fixed valves do not move, while the movable valves respond to the pressure of the up-flowing gas or vapor. The present invention relates to both, fixed and movable valves.

The typical valve configuration ranges from round to trapezoidal as seen from above. Round valves have the disadvantage of allowing part of the gas or vapor to flow opposite to the liquid design flow direction, which creates restrictions to the liquid flow and in the downcomers (by those valve rows close to the downcomer from the tray above). These restrictions reduce the hydraulic capacity of the trays.

The configuration of a rectangular or trapezoidal valve creates less restriction to the liquid flow. However, the first leg of the valve, the leg upstream of the opening respect to the liquid design flow direction, still creates restriction to the liquid flow and promotes solid deposition in fouling systems which may limit the tray hydraulic capacity.

The present invention provides a simple design of a fixed or movable valve that minimizes restrictions to the liquid flow and avoids solid accumulation and deposition on the tray. This improves the tray performance in fouling systems and maximizes the hydraulic capacity of the trays.

GENERAL DESCRIPTION OF THE INVENTION

The present invention provides a cross-flow tray having at least one valve covering an opening. Instead of only one leg upstream of the opening respect to the liquid design flow direction, as prior art valves, the present invention valve has two upstream legs that joint together forming an angle. The joint between both upstream legs is tight enough to practically prevent gas or vapor and liquid to pass between both legs. The angle between both legs can go from very open (less than 180 degrees) to very close (more than 0 degrees). The smaller the angle formed between the both upstream legs the greater tray capacity provided by the valves and also the greater tray fouling resistance.

The third leg which is the downstream leg can be a solid member or it can comprise also more than one support element that together constitute the downstream leg. An opening in the downstream leg can be also provided to minimize any liquid hold-up or solid accumulation just in front of the downstream leg. The downstream leg can be equal or less in height and width respect to the two joined upstream legs.

In case of forming the valves by punching the tray material with a special die (only fixed valves), the upstream legs and the whole valve will be comprise of one piece punched and pressed to the required configuration as discussed above.

DRAWINGS

DETAILED DESCRIPTION OF THE INVENTION

The invention is now further described with reference to the Drawings which are intended to illustrate the invention but not to be understood as implying any essential limitations on the scope of the invention.

Figure 1:
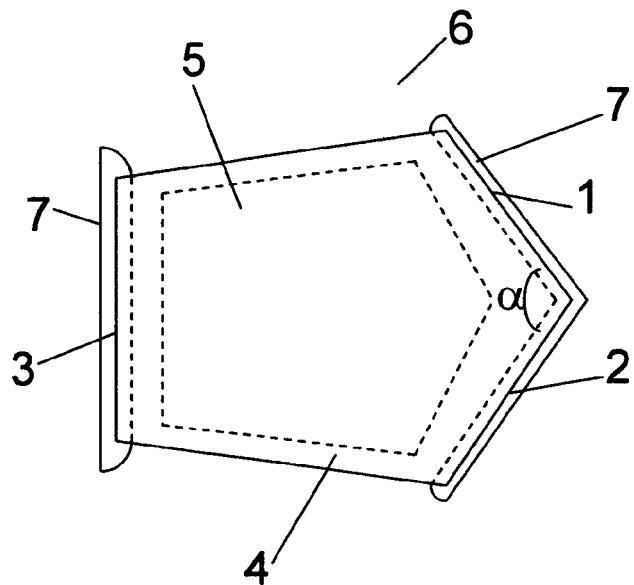
FIG. 1 is the plan view of the valve according to the invention.
Figure 2:
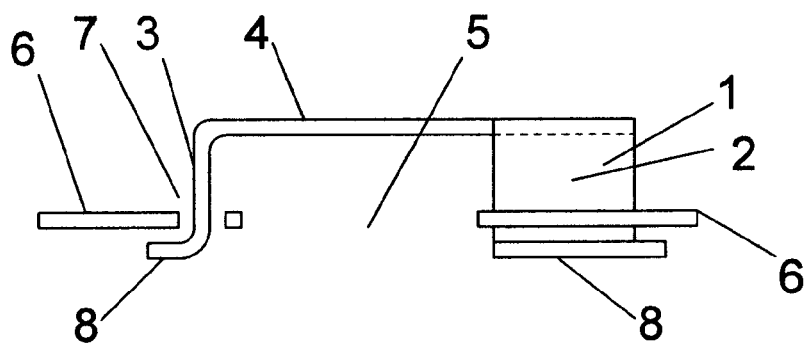
FIG. 2 is the cross-section of the valve shown in FIG. 1.

FIGS. 1 and 2 show the valve according to the invention. The opening, 5, in the tray, 6, is covered by the covering portion of the valve, 4. The two upstream legs, 1 and 2, form an angle $\alpha$ ($0° < \alpha < 180°$). The third leg or downstream leg, 3, may be equal or less in width and height than the two joined upstream legs, 1 and 2. The slots, 7, in the tray, 6, allow the valve to be installed and move (in the case of movable valves). All legs terminated in tabs, 8, which pass through the slots, 7, and secure the valve on the tray when bent or twisted.

Figure 3:
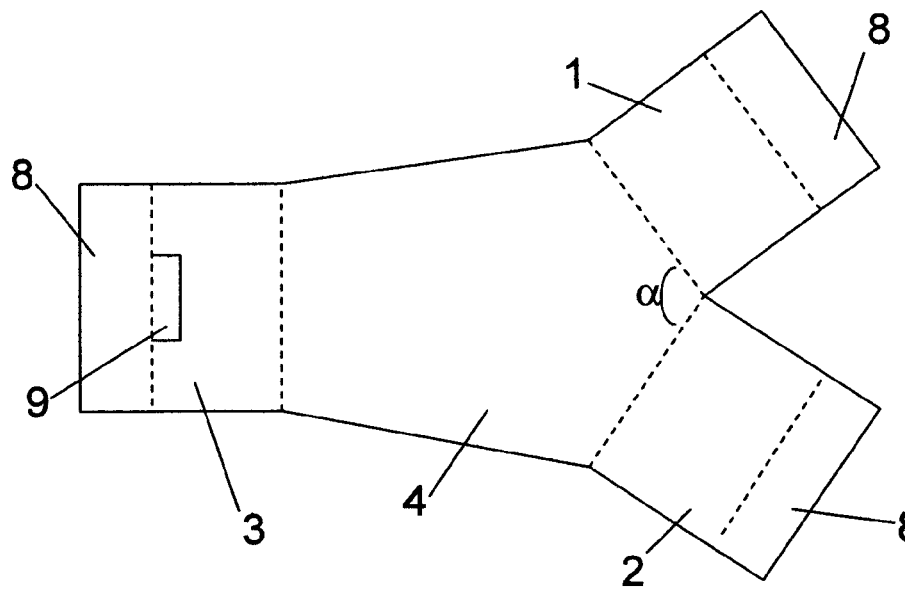
FIG. 3 is a flat plate that can be bent to provide the valve shown in FIGS. 1 and 2.

FIG. 3 shows the flat metal plate to provide the valve according to the invention when bent along the dotted lines and joining both upstream legs, 1 and 2. The third leg, 3, shows the optional opening, 9. The width of tabs, 8, is smaller for fixed valves. Also, for fixed valves, the slots, 7, are shorter, accordingly.

What is claimed is:

1. A mass or heat transfer cross-flow tray comprising: at least one opening covered with a fixed or movable valve, said valve having two upstream legs provided at the upstream side of the at least one opening, the upstream side defined with respect to the liquid design flow direction across the cross-flow tray, said two upstream legs being joined to form an angle less than 180 degrees between the two upstream legs, and wherein the valve shows at least five sides in plan view.

2. The mass or heat transfer cross-flow tray according to claim 1, wherein the valve comprises a third or downstream leg, said third or downstream leg has a width that is equal to or less than the width of the two joined upstream legs.

3. The mass or heat transfer cross-flow tray according to claim 2, wherein said third or downstream leg has a height equal to or less than the height of the two joined upstream legs.

4. The mass or heat transfer cross-flow tray according to claim 1, wherein the valve is formed by punching the tray material or by punching a metal plate, thereby creating an angled upstream leg.

* * * * *